United States Patent
Intile et al.

(10) Patent No.: US 9,334,803 B2
(45) Date of Patent: May 10, 2016

(54) METHOD OF RECOVERING ENERGY IN A STEAM-COOLED GAS TURBINE

(71) Applicant: General Electric Company, Schenectady, NY (US)

(72) Inventors: John Charles Intile, Simpsonville, SC (US); Kevin Richard Kirtley, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 445 days.

(21) Appl. No.: 13/971,196

(22) Filed: Aug. 20, 2013

(65) Prior Publication Data

US 2015/0052897 A1    Feb. 26, 2015

(51) Int. Cl.
*F02C 7/12* (2006.01)
*F02C 7/08* (2006.01)

(52) U.S. Cl.
CPC ... *F02C 7/12* (2013.01); *F02C 7/08* (2013.01); *F05D 2260/205* (2013.01); *F05D 2260/213* (2013.01); *F05D 2260/2322* (2013.01)

(58) Field of Classification Search
CPC ............... F02C 6/08; F02C 7/18; F02C 7/12; F02C 7/08; F23R 3/02–3/26; F23R 3/346; F05D 2260/205; F05D 2260/213
See application file for complete search history.

(56) References Cited

U.S. PATENT DOCUMENTS

| | | | | |
|---|---|---|---|---|
| 3,705,492 A | * | 12/1972 | Vickers | F23R 3/04 60/39.511 |
| 3,756,020 A | * | 9/1973 | Moskowitz | F02C 7/14 415/114 |
| 6,295,803 B1 | * | 10/2001 | Bancalari | F01D 5/18 415/114 |
| 6,406,254 B1 | | 6/2002 | Itzel et al. | |
| 6,532,744 B1 | * | 3/2003 | Reiter | F02C 7/18 415/115 |
| 7,299,618 B2 | | 11/2007 | Terazaki et al. | |

* cited by examiner

*Primary Examiner* — Phutthiwat Wongwian
*Assistant Examiner* — Rene Ford
(74) *Attorney, Agent, or Firm* — Nixon & Vanderhye P.C.

(57) ABSTRACT

A method of recovering heat energy from a cooling medium used to cool hot gas path components in a turbine engine includes cooling one or more hot gas path components with the cooling medium; supplying spent cooling medium used to cool the one or more hot gas path components to a heat exchanger; supplying air (e.g., compressor discharge air) to the heat exchanger so as to be in heat exchange relationship with the spent cooling medium and thereby add heat to the compressor discharge air; and supplying the air heated in the heat exchanger to at least one combustor.

20 Claims, 4 Drawing Sheets

METHOD OF RECOVERING ENERGY IN A STEAM-COOLED GAS TURBINE

The present invention relates generally to steam-cooled turbine engines and, specifically, to a manner in which heat energy can be recovered from spent cooling steam in a gas turbine engine.

BACKGROUND OF THE INVENTION

There have been many efforts focused on the cooling of hot gas path components of gas turbine engines, typically resulting in some loss of efficiency. Closed-loop steam cooling of, for example, stator vanes of the first-stage nozzle in a gas turbine engine extracts heat from the vanes which is transferred to the cooling steam. During this heat energy exchange process, turbine heat energy given up to the steam as a result of cooling the vanes is manifest as a parasitic penalty or loss to combined cycle efficiency.

It would therefor be desirable to provide a cooling circuit for steam-cooled gas turbine components that recovers at least a portion of the heat energy otherwise lost to the cooling process.

BRIEF SUMMARY OF THE INVENTION

In one exemplary but nonlimiting embodiment, the invention relates to a method of recovering heat energy from a cooling medium used to cool hot gas path components in a turbine engine comprising: (a) cooling one or more hot gas path components with the medium; (b) supplying spent cooling medium used to cool the one or more hot gas path components to a heat exchanger; (c) supplying air cooler than the spent cooling medium to the heat exchanger so as to be in heat exchange relationship with the spent cooling medium and thereby add heat to the air; (d) supplying the air heated in the heat exchanger to at least one combustor.

In another exemplary but nonlimiting embodiment, the invention provides a method of recovering heat energy from a cooling medium used to cool a plurality of stator vanes in a nozzle stage of a gas turbine engine comprising: (a) passing the cooling medium through the plurality of stator vanes; (b) supplying spent cooling medium used to cool the plurality of stator vanes to a heat exchanger; (c) supplying compressor discharge air to the heat exchanger so as to be in heat exchange relationship with the spent cooling medium to thereby extract heat from the spent cooling medium and add heat to the compressor discharge air; (d) supplying the compressor discharge air heated in the heat exchanger to each of a plurality of combustors arranged in an annular array about a rotor of the gas turbine engine; and (e) recycling the spent cooling medium exiting the heat exchanger to step (a) in a closed loop cooling circuit.

In still another aspect the invention provides a an energy reclaiming system adapted to recover heat energy from a medium used to cool stator vanes in a first stage nozzle of a gas turbine engine comprising: a manifold for collecting spent cooling medium exiting the stator vanes, the manifold arranged to supply the spent steam through at least one conduit to a heat exchanger; a compressor adapted to supply compressor discharge air to each of a plurality of combustors arranged in an annular array; the heat exchanger arranged to receive a portion of the compressor discharge air upstream of the plurality of combustors, and to pass the portion of the compressor discharge air in heat exchange relationship with the spent cooling medium; and a second manifold arranged to receive discharge air exiting the heat exchanger and to distribute the discharge air exiting the heat exchanger to each of the plurality of combustors.

The invention will now be described in greater detail in connection with the drawings identified below.

DETAILED DESCRIPTION OF THE INVENTION

Figure 1:
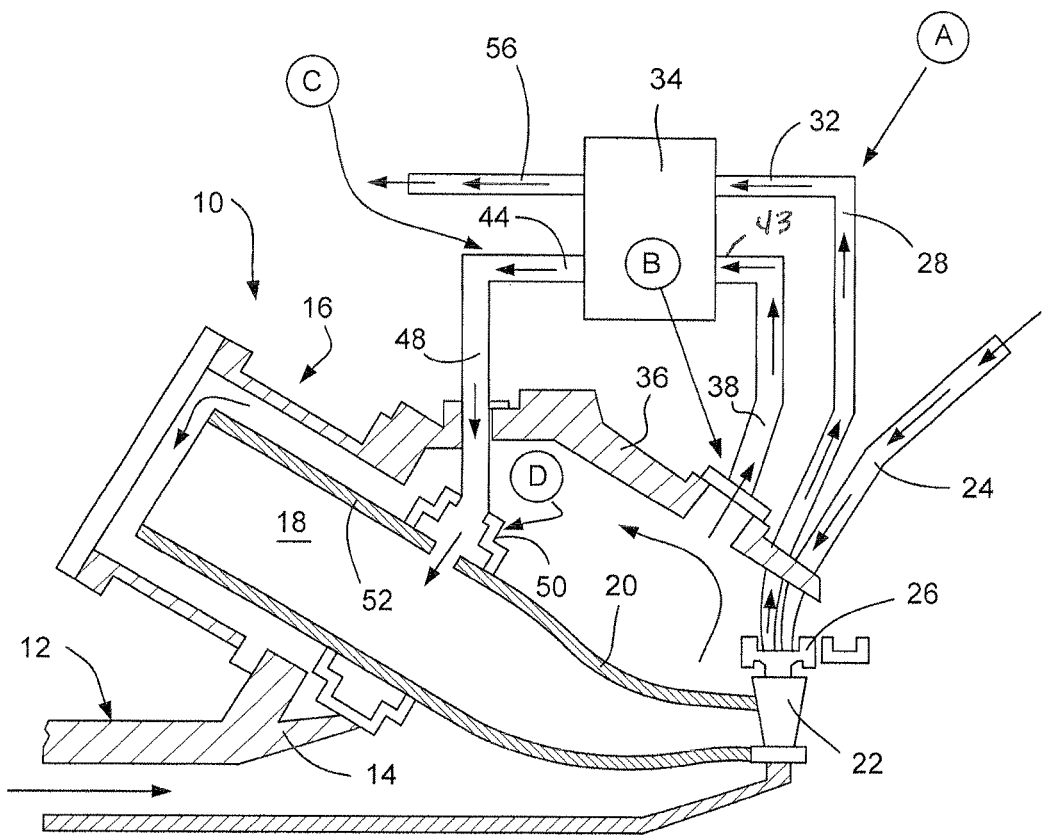
FIG. 1 is a simplified sectional view of a gas turbine combustor and stage one nozzle with a simplified schematic illustration of a heat recovery circuit for recovering heat energy from a cooling medium in accordance with a first exemplary but nonlimiting embodiment of the invention.

With reference to FIG. 1, a conventional combustor 10 of the type employed in a can-annular arrangement of similar combustors in a gas turbine is illustrated. A compressor 12, represented by a compressor outlet diffuser 14 supplies discharge air to the combustor 10 for mixing with fuel at the head end 16 of the combustor where one or more fuel nozzles (not shown) are supported. Fuel and air are ignited in the combustion chamber 18 and the hot combustion gases are supplied via transition piece 20 to the first stage nozzle represented by stator vane 22. It will be understood that there are several combustors arranged in an annular array about the turbine rotor (not shown), each supplying hot combustion gases to the turbine first stage.

Cooling medium, preferably steam, is supplied to the stator vanes 22 via inlet conduit 24 which introduces the cooling steam into an annular manifold (not shown) which, in turn, supplies cooling steam to the internal cooling circuit(s) of each vane via an outer ring 26 which supports a plurality of like vanes in an annular array in the first stage of the turbine section of the engine. The cooling steam, at temperature $T_1$, passes through the internal cooling circuit in each of the stator vanes which, in this first stage, are exposed to the highest-temperature gases exiting the combustor. The vane internal cooling circuit, which may be of any known, suitable design, is not part of this invention, and therefor need not be described in detail.

Figure 2:
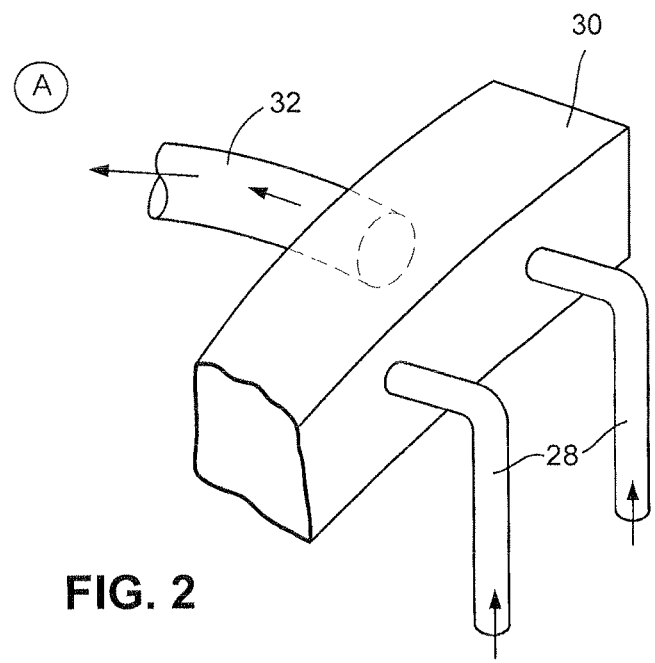
FIG. 2 is an enlarged detail of location A in FIG. 1.

The cooling steam exiting the individual vanes or groups of vanes via exemplary pipe sections 28, is collected in a second manifold 30 as shown in the enlarged detail of location A in FIG. 2, and supplied via pipe section 32 to a heat exchanger 34. The temperature $T_2$ of the cooling medium or steam exiting the first stage stator vanes is higher than the temperature $T_1$ of the cooling medium or steam in the inlet conduit 24, the steam having absorbed heat from the cooling circuits of the collective array of vanes.

Figure 3:
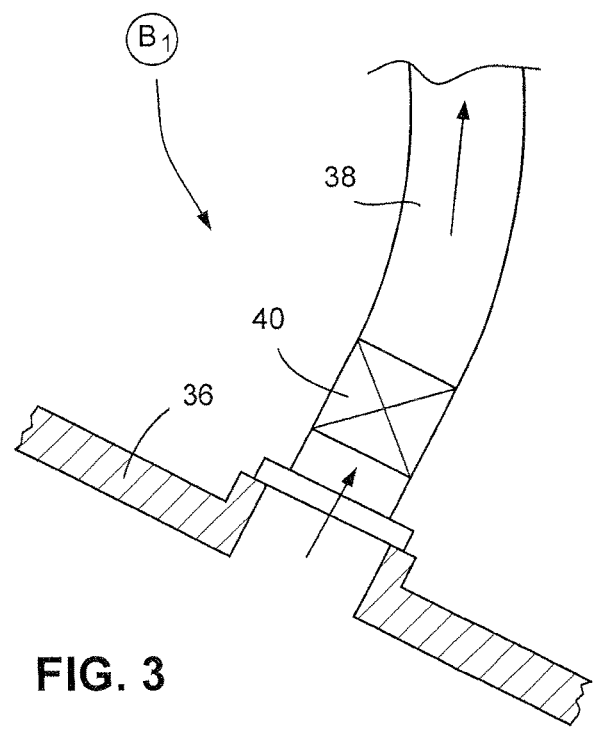
FIG. 3 is a first enlarged detail of location B in FIG. 1.
Figure 4:
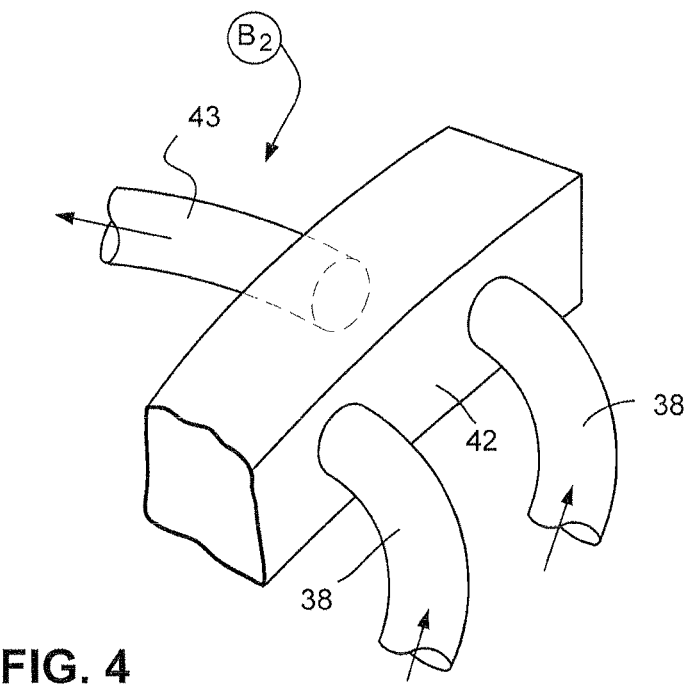
FIG. 4 is a second enlarged detail of location B in FIG. 1.

The "spent", i.e., heated, cooling steam entering the heat exchanger 34 passes in heat-exchange relationship with a portion of the compressor discharge air (or air from another suitable source) that bypasses the combustor 10. Specifically, while a major portion of the compressor discharge air is reverse-flowed to the head end 16 of each combustor where it is introduced into the fuel nozzles for mixing with fuel and subsequent combustion in the combustion chamber 18, a smaller portion of the compressor discharge air bypasses the combustion process by exiting the combustor case 36 and entering a bypass conduit 38 at location B, and specifically $B_1$ as shown in FIG. 3. The bypass conduit 38 is provided with a bypass valve 40 that enables control of air flow (On/Off and amount) that enters an air manifold 42 at location $B_2$ (FIG. 4) noting that the air manifold 42 receives bypass air in multiple pipes or conduits 38 from the various respective combustors in the can-annular array. As noted above, air from the manifold 42 is supplied to the heat exchanger 34 via pipe or conduit 43 where it passes in heat exchange relationship with the "spent" cooling steam.

Figure 5:
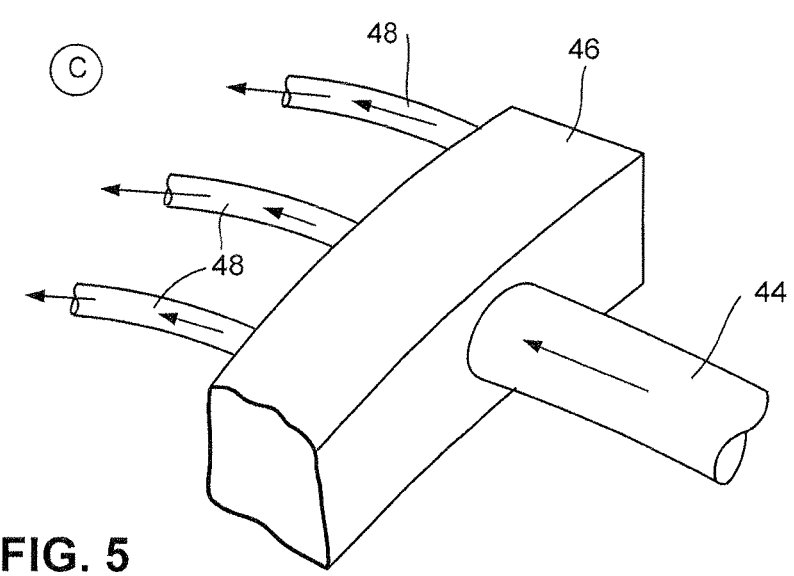
FIG. 5 is an enlarged detail of location C in FIG. 1.

The compressor discharge air absorbs heat in the heat exchanger 34 from the spent cooling steam and is distributed via pipe section 44 to a return-air manifold 46 (see the detail of location C in FIG. 5) surrounding the respective combustors 10, with individual pipes 48 branching off the manifold 46 and extending through their respective combustor cases 36 where they are coupled to a respective internal manifold 50 surrounding the combustor liner 52.

In an exemplary implementation, temperatures of the cooling medium on both sides of the stator vanes (i.e., at inlets and outlets) range from about 700 F to about 1100 F, respectively. Similarly, compressor discharge air temperatures on both sides of the heat exchanger (i.e., at the inlets and outlets) may be in a range of about 800 F to about 950 F, respectively. It will be appreciated that the above temperatures are exemplary only, and may change depending on turbine frame size, operating conditions, and the like.

Accordingly, the temperature of the compressor discharge air exiting the heat exchanger 34 and entering the the combustor (Tc IN) at location D as described below is higher than the temperature of the compressor discharge air (Tc OUT) exiting the combustor at location B and entering the heat exchanger 34, and thus, the difference Tc IN–Tc OUT represents the heat energy recovered from the cooling steam. In the above example, the difference, or recovered heat energy, would be about 150 F.

Figure 6:
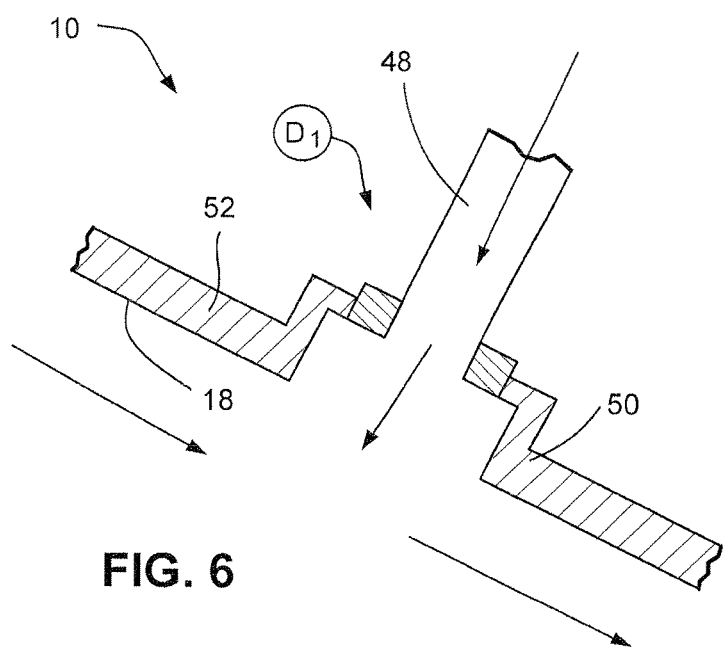
FIG. 6 is an enlarged detail of location D in accordance with a first exemplary embodiment.
Figure 7:
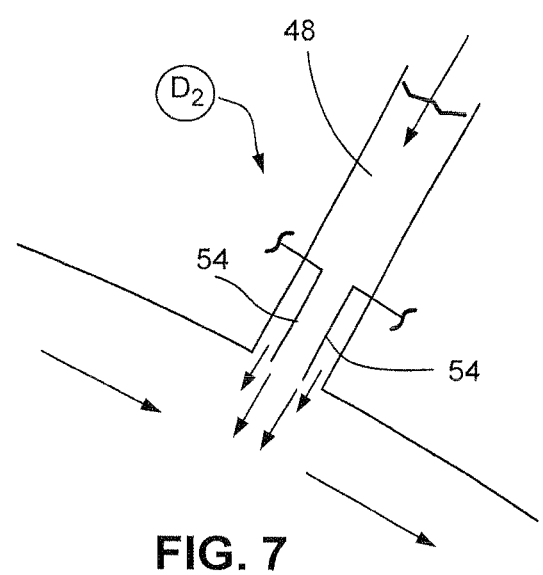
FIG. 7 is an enlarged detail of location D in FIG. 1 in accordance with a second exemplary embodiment.

FIGS. 6 and 7 illustrate variants in the return of the heated air at temperature Tc IN to the combustor at manifold 50. Thus, FIG. 6 illustrates a combustion system without Late Lean Injection (LLI) also known as Axial Fuel Staging (AFS), such that, at location D1, air from the heat exchanger is supplied alone as dilution air to mix with the combustion products in the combustor 10, downstream of the combustion chamber 18, or in the transition piece 20 (FIG. 1) that carries the hot combustion gases to the first turbine stage 22.

FIG. 7 illustrates a combustion system with LLI (or AFS), where fuel is supplied to the pipe 48 via fuel injectors 54 for mixing with air in the pipe 48 at the combustor liner interface and injection into the hot gas path for additional combustion. The air in pipe 48 used for the axial fuel staging characteristic of LLI can be actively or passively controlled.

The spent cooling steam, having been cooled in the heat exchanger 34, may be recycled via pipe section(s) 56 to the first-stage nozzle vane cooling circuit(s) in a closed-loop system (see FIG. 1).

It will be appreciated that the invention as described herein has applicability to both open and closed loop cooling systems using steam, fuel, N2 or other cooling medium, and in cooling circuits used to cool any turbine hot gas path components that typically require cooling.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of recovering heat energy from a cooling medium used to cool hot gas path components in a turbine engine wherein the turbine engine includes a compressor, a combustion section including a plurality of combustors, a casing housing the combustion section, and a heat exchanger external to the combustion section, wherein the method comprises:
    (a) cooling one or more of the hot gas path components with the cooling medium;
    (b) supplying spent cooling medium used to cool the one or more hot gas path components to the heat exchanger;
    (c) supplying compressed air from the compressor to the plurality of combustors, wherein the compressed air from the compressor is cooler than the spent cooling medium being supplied to the heat exchanger;
    (d) supplying at least a portion of the compressed air to the heat exchanger before the compressed air enters any of the plurality of combustors, wherein the at least a portion of the compressed air is in heat exchange relationship with the spent cooling medium and thereby add heat to the compressed air; and
    (e) supplying the air heated in the heat exchanger to at least one of the plurality of combustors.

2. The method of claim 1 wherein the cooling medium comprises steam.

3. The method of claim 1 wherein the hot gas path component comprises stage 1 stator vanes of a gas turbine engine, and wherein said a plurality of combustors is arranged in an annular array.

4. The method of claim 3 wherein the spent cooling medium exiting the stage 1 stator vanes is supplied to a first manifold that, in turn, supplies the spent steam to the heat exchanger.

5. The method of claim 4 wherein the air exiting the heat exchanger is supplied to a second manifold and subsequently distributed to said plurality of combustors.

6. The method of claim 1 wherein after step (d), spent cooling medium is recycled to step (a) in a closed loop process.

7. The method of claim 1 wherein the air is compressor discharge air and step (e) is carried out by introducing the compressor discharge air into the hot gas path downstream of a combustion chamber as dilution air.

8. The method of claim 1 wherein the air is compressor discharge air and step (e) is carried out by introducing the compressor discharge air with fuel into the combustor in a late-lean injection combustion process.

9. The method of claim 1 wherein cooling medium supplied to the heat exchanger is controlled by at least one control valve, and wherein the air heated in the heat exchanger and supplied to at least one of the plurality of combustors is controlled by at least one other control valve.

10. A method of recovering heat energy from a cooling medium used to cool a plurality of stator vanes in a nozzle stage of a gas turbine engine including a compressor and a combustion section having a plurality of combustors, the method comprising:
    (a) passing the cooling medium through the plurality of stator vanes;

(b) supplying spent cooling medium used to cool the plurality of stator vanes to a heat exchanger, wherein the heat exchanger is external to a casing of the combustion section;

(c) supplying compressor discharge air from the compressor to the heat exchanger so as to be in heat exchange relationship with the spent cooling medium to thereby extract heat from the spent cooling medium and add heat to the compressor discharge air passing through the heat exchanger;

(d) supplying the compressor discharge air heated in the heat exchanger to each of the plurality of combustors arranged in an annular array about a rotor of the gas turbine engine; and (e) recycling the spent cooling medium exiting the heat exchanger to step (a) in a closed loop cooling circuit.

11. The method of claim 10 wherein step (d) is carried out by introducing the compressor discharge air into a hot gas path downstream of a combustion chamber in each of said plurality of combustors as dilution air.

12. The method of claim 10 wherein step (d) is carried out by introducing the compressor discharge air and fuel into a combustion chamber in each of said plurality of combustors in a late-lean fuel injection combustion process.

13. The method of claim 10 wherein the cooling medium comprises steam.

14. The method of claim 13 wherein the spent cooling medium exiting the plurality of stator vanes is supplied to a first manifold that, in turn, supplies the spent steam to the heat exchanger.

15. The method of claim 14 wherein the heated compressor discharge air exiting the heat exchanger is supplied to a second manifold and subsequently distributed to said plurality of combustors.

16. The method of claim 10 wherein cooling medium supplied to the heat exchanger is controlled by at least one control valve, and wherein air heated in the heat exchanger and supplied to the combustor is controlled by at least one other control valve.

17. An energy reclaiming system adapted to recover heat energy from a medium used to cool stator vanes in a first-stage nozzle of a gas turbine engine comprising:

a casing assembly housing a compressor, a combustion section and turbine of the gas turbine engine, wherein the first stage nozzle and the stator vanes are included in the turbine;

a manifold mounted to the casing assembly and adapted to collect spent cooling medium exiting the stator vanes, said manifold arranged to supply the spent steam through at least one conduit to a heat exchanger located outside of the casing;

the compressor adapted to supply compressor discharge air to each of a plurality of combustors arranged in an annular array within the combustion section;

the heat exchanger arranged to receive a portion of the compressor discharge air upstream of the plurality of combustors, and to pass the said portion of the compressor discharge air in heat exchange relationship with the spent cooling medium; and a second manifold mounted to the casing assembly and arranged to receive the compressor discharge air exiting the heat exchanger and to distribute the compressor discharge air exiting the heat exchanger to each of the plurality of combustors.

18. The energy reclaiming system of claim 17 including valves for controlling spent medium supply to the heat exchanger and discharge air supply to the plurality of combustors.

19. The energy reclaiming system of claim 17 wherein the second manifold is arranged to supply compressor discharge air exiting the heat exchanger to locations in the plurality of combustors downstream of combustion chambers of said combustors.

20. The energy reclaiming system of claim 17 wherein the second manifold is arranged to supply compressor discharge air exiting the heat exchanger and late lean injection fuel to combustion chambers of the plurality of combustors.

\* \* \* \* \*

UNITED STATES PATENT AND TRADEMARK OFFICE
CERTIFICATE OF CORRECTION

PATENT NO.        : 9,334,803 B2
APPLICATION NO.   : 13/971196
DATED             : May 10, 2016
INVENTOR(S)       : Intile et al.

Page 1 of 1

It is certified that error appears in the above-identified patent and that said Letters Patent is hereby corrected as shown below:

In the Specification:

At Col. 3, line 31, change "the the combustor" to --the combustor--

In the Claims:

In Claim 3 at Col. 4, line 36, change "Wherein said a plurality of combustors" to --Wherein said plurality of combustors--

Signed and Sealed this
Fifth Day of July, 2016

Michelle K. Lee
*Director of the United States Patent and Trademark Office*